(12) United States Patent
Yeh (10) Patent No.: US 11,455,243 B2
(45) Date of Patent: Sep. 27, 2022

(54) DATA MERGE METHOD PERFORMING DATA MERGE OPERATIONS WITH IDENTIFYING VALID DATA OF SOURCE NODES FOR NEXT DATA MERGE OPERATION, MEMORY STORAGE DEVICE, AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/113,122

(22) Filed: Dec. 7, 2020

(65) Prior Publication Data
US 2022/0147443 A1   May 12, 2022

(30) Foreign Application Priority Data

Nov. 10, 2020   (TW) .................. 109139185

(51) Int. Cl.
*G06F 12/02* (2006.01)
*G06F 12/0831* (2016.01)
*G06F 12/0891* (2016.01)

(52) U.S. Cl.
CPC ...... *G06F 12/0246* (2013.01); *G06F 12/0292* (2013.01); *G06F 12/0833* (2013.01); *G06F 12/0891* (2013.01); *G06F 2212/7201* (2013.01)

(58) Field of Classification Search
CPC ............. G06F 12/0246; G06F 12/0292; G06F 12/0833; G06F 12/0891; G06F 2212/7201
See application file for complete search history.

(56) References Cited

U.S. PATENT DOCUMENTS 8,706,953 B2 * 4/2014 Cho .................. H03M 7/30
711/103
9,280,479 B1 * 3/2016 Kruckemyer ......... G06F 9/38
(Continued)

FOREIGN PATENT DOCUMENTS

TW   202009709   3/2020

OTHER PUBLICATIONS

"Office Action of Taiwan Counterpart Application", dated Apr. 23, 2021, p. 1-p. 7.

*Primary Examiner* — Tasnima Matin
(74) *Attorney, Agent, or Firm* — JCIPRNET (57) ABSTRACT

A data merge method for a rewritable non-volatile memory module including multiple physical units is provided. The method includes: starting a first data merge operation, and selecting at least one first physical unit for executing the first data merge operation and at least one second physical unit for executing a second data merge operation from the physical units; reading first mapping information from the rewritable non-volatile memory module, and copying first valid data collected from the at least one first physical unit to at least one third physical unit in the physical units; identifying second valid data in the at least one second physical unit according to the first mapping information in the first data merge operation; and starting the second data merge operation, and copying the second valid data collected from the at least one second physical unit to at least one fourth physical unit in the physical units.

18 Claims, 7 Drawing Sheets

(56) References Cited

U.S. PATENT DOCUMENTS

| | | | |
|---|---|---|---|
| 2012/0079231 A1* | 3/2012 | Huang | G06F 12/0246 |
| | | | 711/206 |
| 2013/0117520 A1* | 5/2013 | Ryu | G06F 12/02 |
| | | | 711/165 |
| 2014/0372668 A1* | 12/2014 | Yeh | G06F 12/0292 |
| | | | 711/103 |
| 2015/0131386 A1* | 5/2015 | Yeh | G11C 16/10 |
| | | | 365/185.29 |
| 2016/0170647 A1* | 6/2016 | Lin | G11C 16/3495 |
| | | | 711/103 |
| 2016/0179386 A1* | 6/2016 | Zhang | G06F 3/0688 |
| | | | 711/103 |
| 2017/0177469 A1* | 6/2017 | Hashimoto | G06F 12/0246 |
| 2020/0201755 A1* | 6/2020 | Byun | G06F 12/122 |

\* cited by examiner

DATA MERGE METHOD PERFORMING DATA MERGE OPERATIONS WITH IDENTIFYING VALID DATA OF SOURCE NODES FOR NEXT DATA MERGE OPERATION, MEMORY STORAGE DEVICE, AND MEMORY CONTROL CIRCUIT UNIT

CROSS-REFERENCE TO RELATED APPLICATION

This application claims the priority benefit of Taiwan application serial no. 109139185, filed on Nov. 10, 2020. The entirety of the above-mentioned patent application is hereby incorporated by reference herein and made a part of this specification.

BACKGROUND

Technical Field

The disclosure relates to a flash memory technology, and particularly relates to a data merge method, a memory storage device, and a memory control circuit unit.

Description of Related Art

Digital cameras, mobile phones, and MP3 players have grown rapidly over the past few years, which has led to a rapid increase in consumer demand for storage media. Since the rewritable non-volatile memory module (for example, the flash memory) have characteristics such as non-volatile data, power saving, small size, and no mechanical structure, the rewritable non-volatile memory module is very suitable to be built into the various portable multimedia devices mentioned above.

When the memory storage device leaves the factory, a part of the physical units in the memory storage device are configured as multiple spare physical units for storing new data. After a period of use, the number of spare physical units in the memory storage device will be gradually reduced. The memory storage device may copy valid data from multiple source nodes to a recycling node (also known as a target node) by a data merge process (or known as a garbage collection process) and erase the physical units belonging to the source nodes to release new spare physical units.

Generally speaking, in each data merge process, it is necessary to access a table that records management information (for example, mapping information) of logic units mapped by multiple physical units of the source nodes to identify valid data. However, when there is a large amount of management information required to be accessed, the number of accesses to the memory storage device will increase and the overall performance of the memory storage device will drop.

SUMMARY

The disclosure provides a data merge method, a memory storage device, and a memory control circuit unit, which can improve the issues mentioned above and effectively reduce the number of accesses to the memory storage device in a data merge process.

An exemplary embodiment of the disclosure provides a data merge method for a rewritable non-volatile memory module. The rewritable non-volatile memory module includes multiple physical units. The data merge method includes the following steps. A first data merge operation is started, and at least one first physical unit for executing the first data merge operation and at least one second physical unit for executing a second data merge operation are selected from the physical units. In the first data merge operation, first mapping information is read from the rewritable non-volatile memory module, and first valid data collected from the at least one first physical unit is copied to at least one third physical unit in the physical units according to the first mapping information. In the first data merge operation, second valid data in the at least one second physical unit is identified according to the first mapping information. The second data merge operation is started, and the second valid data collected from the at least one second physical unit is copied to at least one fourth physical unit in the physical units.

An exemplary embodiment of the disclosure further provides a memory storage device, which includes a connection interface unit, a rewritable non-volatile memory module, and a memory control circuit unit. The connection interface unit is configured to couple to a host system. The rewritable non-volatile memory module includes multiple physical units. The memory control circuit unit is coupled to the connection interface unit and the rewritable non-volatile memory module. The memory control circuit unit is configured to start a first data merge operation, and select at least one first physical unit for executing the first data merge operation and at least one second physical unit for executing a second data merge operation from the physical units. The memory control circuit unit is further configured to read first mapping information from the rewritable non-volatile memory module, and copy first valid data collected from the at least one first physical unit to at least one third physical unit in the physical units according to the first mapping information in the first data merge operation. The memory control circuit unit is further configured to identify second valid data in the at least one second physical unit according to the first mapping information in the first data merge operation. The memory control circuit unit is further configured to start the second data merge operation, and copy the second valid data collected from the at least one second physical unit to at least one fourth physical unit in the physical units.

An exemplary embodiment of the disclosure further provides a memory control circuit unit, which is configured to control a rewritable non-volatile memory module. The rewritable non-volatile memory module includes multiple physical units. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to start a first data merge operation, and select at least one first physical unit for executing the first data merge operation and at least one second physical unit for executing a second data merge operation from the physical units. The memory management circuit is further configured to read first mapping information from the rewritable non-volatile memory module, and copy first valid data collected from the at least one first physical unit to at least one third physical unit in the physical units according to the first mapping information in the first data merge operation. The memory management circuit is further configured to identify second valid data in the at least one second physical unit according to the first mapping information in the first data merge operation. The memory management circuit is further configured to start the second data merge operation, and copy the second valid data collected from the at least one second physical unit to at least one fourth physical unit in the physical units.

Based on the above, in a data merge operation, the memory management circuit selects in advance the source node of the next data merge operation in the current data merge operation. Therefore, when the mapping information mapped by the source node of the data merge operation contains the mapping information of the source node of the next data merging operation, the valid data of the source node is identified in advance, so that the read operation of the logical-to-physical mapping table used to access the source node of the next data merge operation may be omitted. As such, the number of accesses to the memory storage device in the data merge operation may be effectively reduced, thereby improving the overall operating performance of the memory storage device.

In order to make the above-mentioned features and advantages of the disclosure more comprehensible, the following specific embodiments are described in detail in conjunction with the accompanying drawings.

DETAILED DESCRIPTION OF DISCLOSED EMBODIMENTS

Generally speaking, a memory storage device (also known as a memory storage system) includes a rewritable non-volatile memory module and a controller (also known as a control circuit). Usually, the memory storage device is used together with the host system, so that the host system may write data to the memory storage device or read data from the memory storage device.

Figure 1:
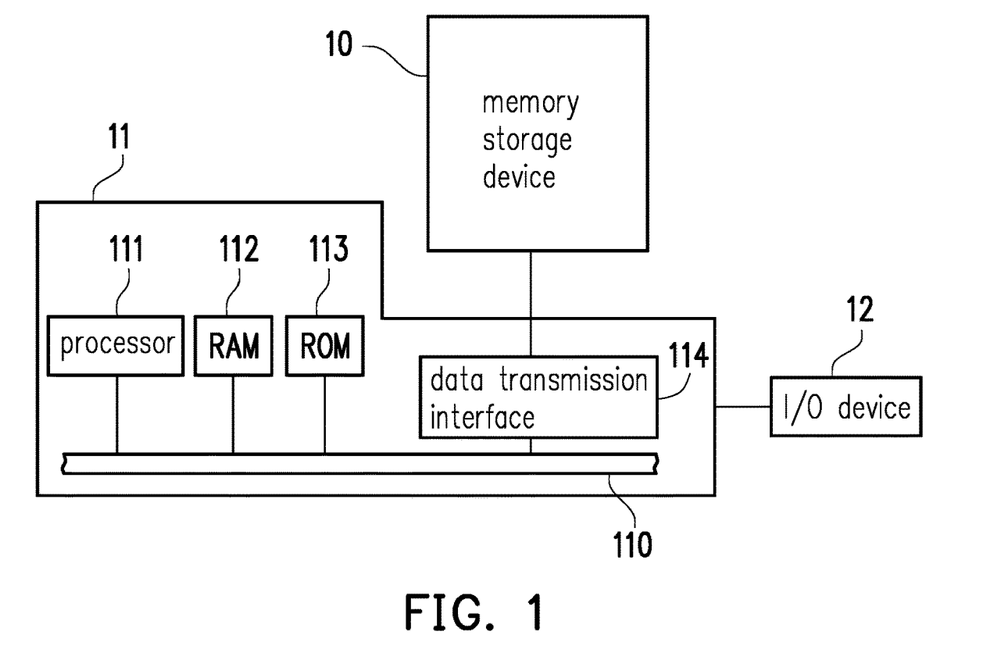
FIG. 1 is a schematic diagram of a host system, a memory storage device, and an input/output (I/O) device according to an exemplary embodiment of the disclosure.
Figure 2:
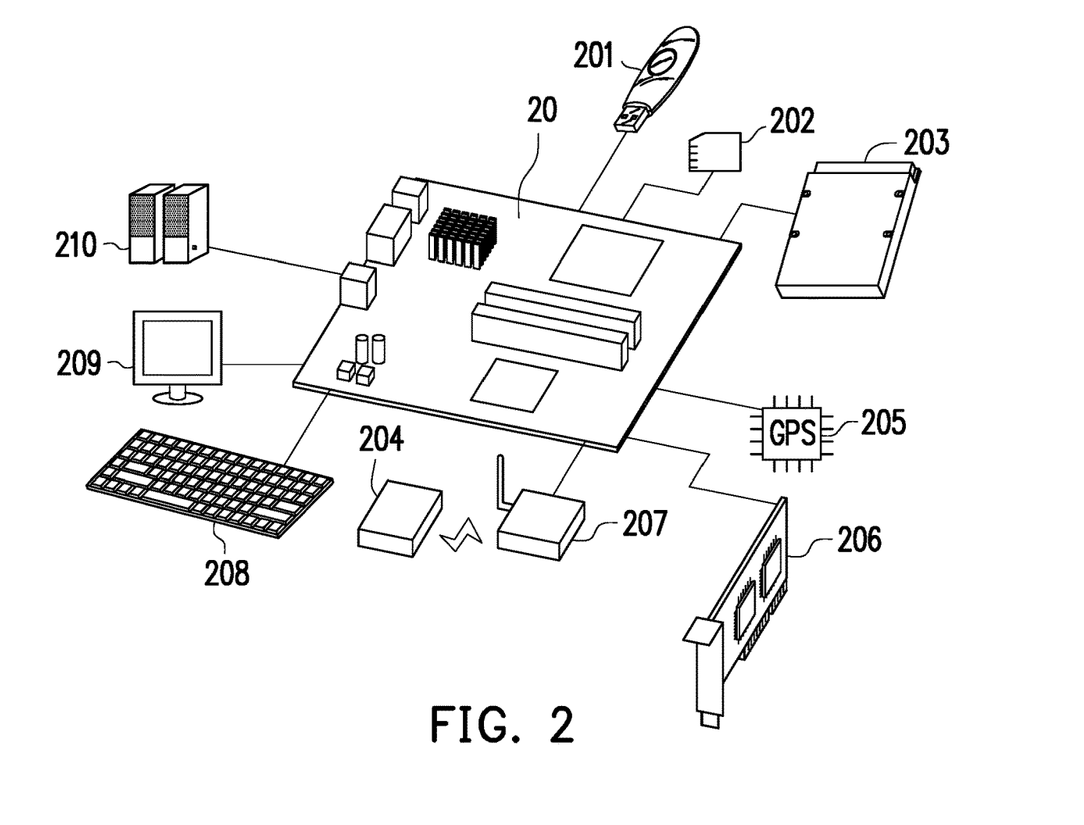
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Please refer to FIG. 1 and FIG. 2. A host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 is coupled to the I/O device 12 through the system bus 110. For example, the host system 11 may send an output signal to or receive an input signal from the I/O device 12 via the system bus 110.

In the exemplary embodiment, the processor 111, the random access memory 112, the read only memory 113, and the data transmission interface 114 may be disposed on a motherboard 20 of the host system 11. The number of data transmission interface 114 may be one or more. Through the data transmission interface 114, the motherboard 20 may be coupled to the memory storage device 10 via wired or wireless means. The memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to various I/O devices such as a global positioning system (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage device 204 through the wireless transmission device 207.

Figure 3:
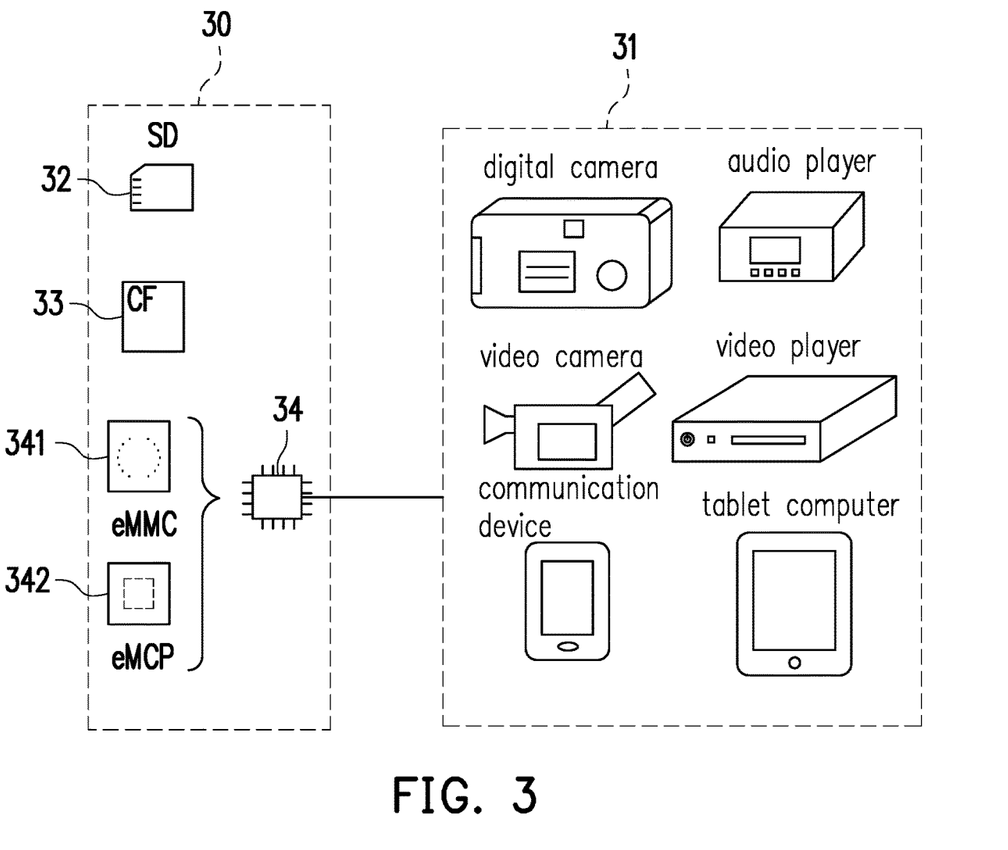
FIG. 3 is a schematic diagram of a host system and a memory storage device according to another exemplary embodiment of the disclosure.

In an exemplary embodiment, the mentioned host system is any system that may substantially cooperate with a memory storage device to store data. Although in the above exemplary embodiment, the host system is described as a computer system, FIG. 3 is a schematic diagram of a host system and a memory storage device according to another exemplary embodiment of the disclosure. Please refer to FIG. 3. In another exemplary embodiment, a host system 31 may also be a system such as a digital camera, a video camera, a communication device, an audio player, a video player, or a tablet computer. The memory storage device 30 may be various non-volatile memory storage devices such as a secure digital (SD) card 32, a compact flash (CF) cards 33, or an embedded storage device 34 used by the host system 31. The embedded storage device 34 includes various embedded storage devices such as an embedded multi media card (eMMC) 341 and/or an embedded multi chip package (eMCP) storage device 342 that directly couple the memory module onto the substrate of the host system.

Figure 4:
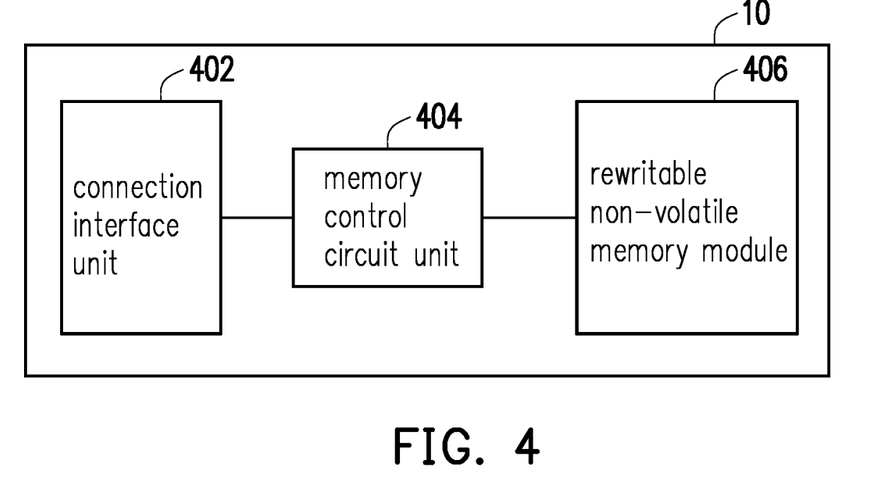
FIG. 4 is a schematic block diagram of a memory storage device according to an exemplary embodiment of the disclosure.

FIG. 4 is a schematic block diagram of a memory storage device according to an exemplary embodiment of the disclosure.

Please refer to FIG. 4. A memory storage device 10 includes a connection interface unit 402, a memory control circuit unit 404, and a rewritable non-volatile memory module 406.

The connection interface unit 402 is configured to couple the memory storage device 10 to a host system 11. The memory storage device 10 may communicate with the host system 11 through the connection interface unit 402. In the exemplary embodiment, the connection interface unit 402 is compatible with the Serial Advanced Technology Attachment (SATA) standard. However, it must be understood that the disclosure is not limited thereto, and the connection interface unit 402 may also conform to the Parallel Advanced Technology Attachment (PATA) standard, the Institute of Electrical and Electronic Engineers (IEEE) 1394 standard, high-speed peripheral component interconnect express (PCI express) interface standard, universal serial bus (USB) standard, SD interface standard, ultra high speed-I (UHS-I) interface standard, ultra high speed-II (UHS-II) interface standard, memory stick (MS) interface standard, MCP interface standard, MMC interface standard, eMMC interface standard, universal flash storage (UFS) interface standard, eMCP interface standard, CF interface standard, integrated device electronics (IDE) interface standard, or other suitable standards. The connection interface unit 402 and the memory control circuit unit 404 may be packaged in a chip, or the connection interface unit 402 may be arranged outside a chip containing the memory control circuit unit 404.

The memory control circuit unit 404 is configured to execute multiple logic gates or control commands implemented in the form of hardware or in the form of firmware, and to perform operations such as writing, reading, and erasing data in the rewritable non-volatile memory module 406 according to the commands of the host system 11.

The rewritable non-volatile memory module 406 is coupled to the memory control circuit unit 404 and is configured to store the data written by the host system 11. The rewritable non-volatile memory module 406 may be a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 406 stores one or more bits with a change in voltage (hereinafter also referred to as a threshold voltage). Specifically, there is a charge trapping layer between the control gate and the channel of each memory cell. Through applying a write voltage to the control gate, the amount of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 406 has multiple storage states. It is possible to determine which storage state a memory cell belongs to through applying a read voltage, thereby obtaining one or more bits stored in the memory cell.

In the exemplary embodiment, the memory cells of the rewritable non-volatile memory module 406 may constitute multiple physical programming units, and the physical programming units may constitute multiple physical erasing units. Specifically, the memory cells on the same character line may form one or more physical programming units. If each memory cell may store more than 2 bits, the physical programming units on the same character line may be at least classified into a lower physical programming unit and an upper physical programming unit. For example, the least significant bit (LSB) of a memory cell belongs to the lower physical programming unit, and the most significant bit (MSB) of a memory cell belongs to the upper physical programming unit. Generally speaking, in an MLC NAND flash memory, the writing speed of the lower physical programming unit is higher than the writing speed of the upper physical programming unit, and/or the reliability of the lower physical programming unit is higher than the reliability of the upper physical programming unit.

In the exemplary embodiment, the physical programming unit is the smallest programming unit. That is, the physical programming unit is the smallest unit for writing data. For example, the physical programming unit may be a physical page or a physical sector. If the physical programming unit is a physical page, the physical programming units may include a data bit area and a redundancy bit area. The data bit area contains multiple physical sectors for storing user data, and the redundant bit area is configured to store system data (for example, management data such as error correction codes). In the exemplary embodiment, a data bit area contains 32 physical sectors, and the size of a physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest erasing unit. That is, each physical erasing unit contains the smallest number of erased memory cells. For example, the physical erasing unit is a physical block.

Figure 5:
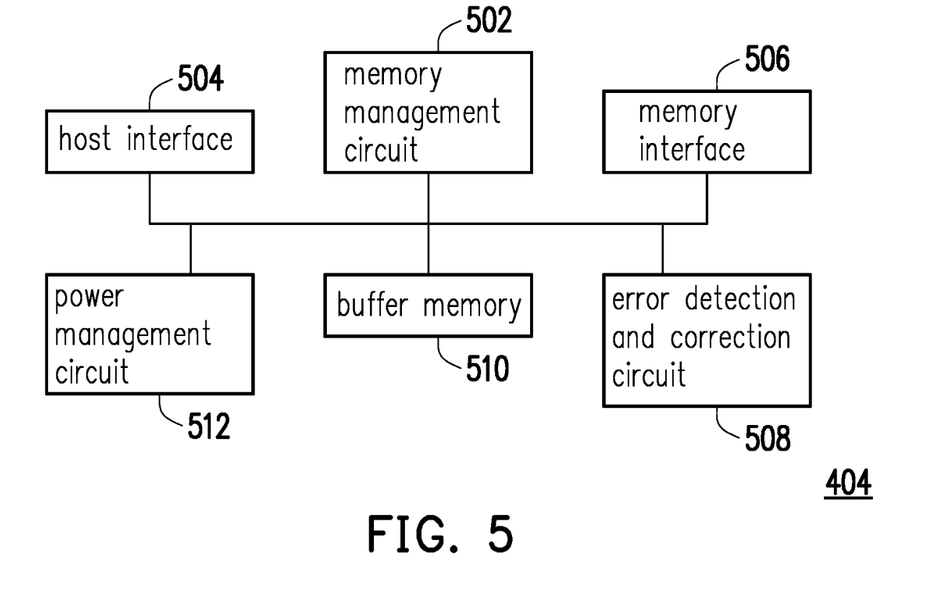
FIG. 5 is a schematic block diagram of a memory control circuit unit according to an exemplary embodiment of the disclosure.

FIG. 5 is a schematic block diagram of a memory control circuit unit according to an exemplary embodiment of the disclosure.

Please refer to FIG. 5. A memory control circuit unit 404 includes a memory management circuit 502, a host interface 504, and a memory interface 506.

The memory management circuit 502 is configured to control the overall operation of the memory control circuit unit 404. Specifically, the memory management circuit 502 has multiple control commands, and when the memory storage device 10 is operating, the control commands are executed to perform operations such as writing, reading, and erasing data. The following description of the operation of the memory management circuit 502 is equivalent to the description of the operation of the memory control circuit unit 404.

In the exemplary embodiment, the control commands of the memory management circuit 502 are implemented in the form of firmware. For example, the memory management circuit 502 has a micro processor unit (not shown) and a read only memory (not shown), and the control commands are burned to the read only memory. When the memory storage device 10 is operating, the control commands are executed by the micro processor unit to perform operations such as writing, reading, and erasing data.

In another exemplary embodiment, the control commands of the memory management circuit 502 may also be stored in a specific area (for example, a system area in the memory module dedicated to storing system data) of the rewritable non-volatile memory module 406 in the form of program code. In addition, the memory management circuit 502 has a micro processor unit (not shown), a read only memory (not shown), and a random access memory (not shown). In particular, the read only memory has a boot code, and when the memory control circuit unit 404 is enabled, the microprocessor unit will first execute the boot code to load the control commands stored in the rewritable non-volatile memory module 406 into the random access memory of the memory management circuit 502. After that, the microprocessor unit will run the control commands to perform operations such as writing, reading, and erasing data.

In addition, in another exemplary embodiment, the control commands of the memory management circuit 502 may also be implemented in the form of hardware. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cell or the memory cell group of the rewritable non-volatile memory module 406. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write command sequence, the read command sequence, and the erase command sequence may each include one or more program codes or command codes and are configured to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct to execute corresponding operations.

The host interface 504 is coupled to the memory management circuit 502. The memory management circuit 502 may communicate with the host system 11 through the host interface 504. The host interface 504 may be configured to receive and identify commands and data sent by the host system 11. For example, the commands and data sent by the host system 11 may be sent to the memory management circuit 502 through the host interface 504. In addition, the memory management circuit 502 may send data to the host system 11 through the host interface 504. In the exemplary embodiment, the host interface 504 is compatible with the SATA standard. However, it must be understood that the disclosure is not limited thereto, and the host interface 504 may also be compatible with PATA standard, IEEE 1394 standard, PCI express standard, USB standard, SD standard, UHS-I standard, UHS-II standard, MS standard, MMC standard, eMMC standard, UFS standard, CF standard, IDE standard, or other suitable data transmission standards.

The memory interface 506 is coupled to the memory management circuit 502 and is configured to access the rewritable non-volatile memory module 406. In other words, the data to be written to the rewritable non-volatile memory module 406 will be converted into a format acceptable by the rewritable non-volatile memory module 406 via the memory interface 506. Specifically, if the memory management circuit 502 intends to access the rewritable non-volatile memory module 406, the memory interface 506 will send the corresponding command sequence. For example, the command sequences may include a write command sequence instructing to write data, a read command sequence instructing to read data, an erase command sequence instructing to erase data, and corresponding command sequences configured to instruct various memory operations (for example, operations such as changing the read voltage level or executing garbage collection). The command sequences are, for example, generated by the memory management circuit 502 and are sent to the rewritable non-volatile memory module 406 through the memory interface 506. The command sequences may include one or more signals, or data on the bus. The signals or data may include command codes or program codes. For example, in the read command sequence, information such as read identification code and memory address are included.

In an exemplary embodiment, the memory control circuit unit 404 further includes an error detection and correction circuit 508, a buffer memory 510, and a power management circuit 512.

The error detection and correction circuit 508 is coupled to the memory management circuit 502 and is configured to execute error detection and correction operations to ensure the correctness of data. Specifically, when the memory management circuit 502 receives a write command from the host system 11, the error detection and correction circuit 508 will generate a corresponding error correcting code (ECC) and/or error detecting code (EDC) for the data corresponding to the write command, and the memory management circuit 502 will write the data corresponding to the write command and the corresponding ECC and/or EDC into the rewritable non-volatile memory module 406. Later, when the memory management circuit 502 reads data from the rewritable non-volatile memory module 406, the ECC and/or the EDC corresponding to the data will also be read, and the error detection and correction circuit 508 will execute error detection and correction operations on the read data according to the ECC and/or the EDC.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, the memory control circuit unit 404 is also referred to as a flash memory controller for controlling a flash memory module, and/or the memory management circuit 502 of FIG. 5 is also referred to as a flash memory management circuit.

Figure 6:
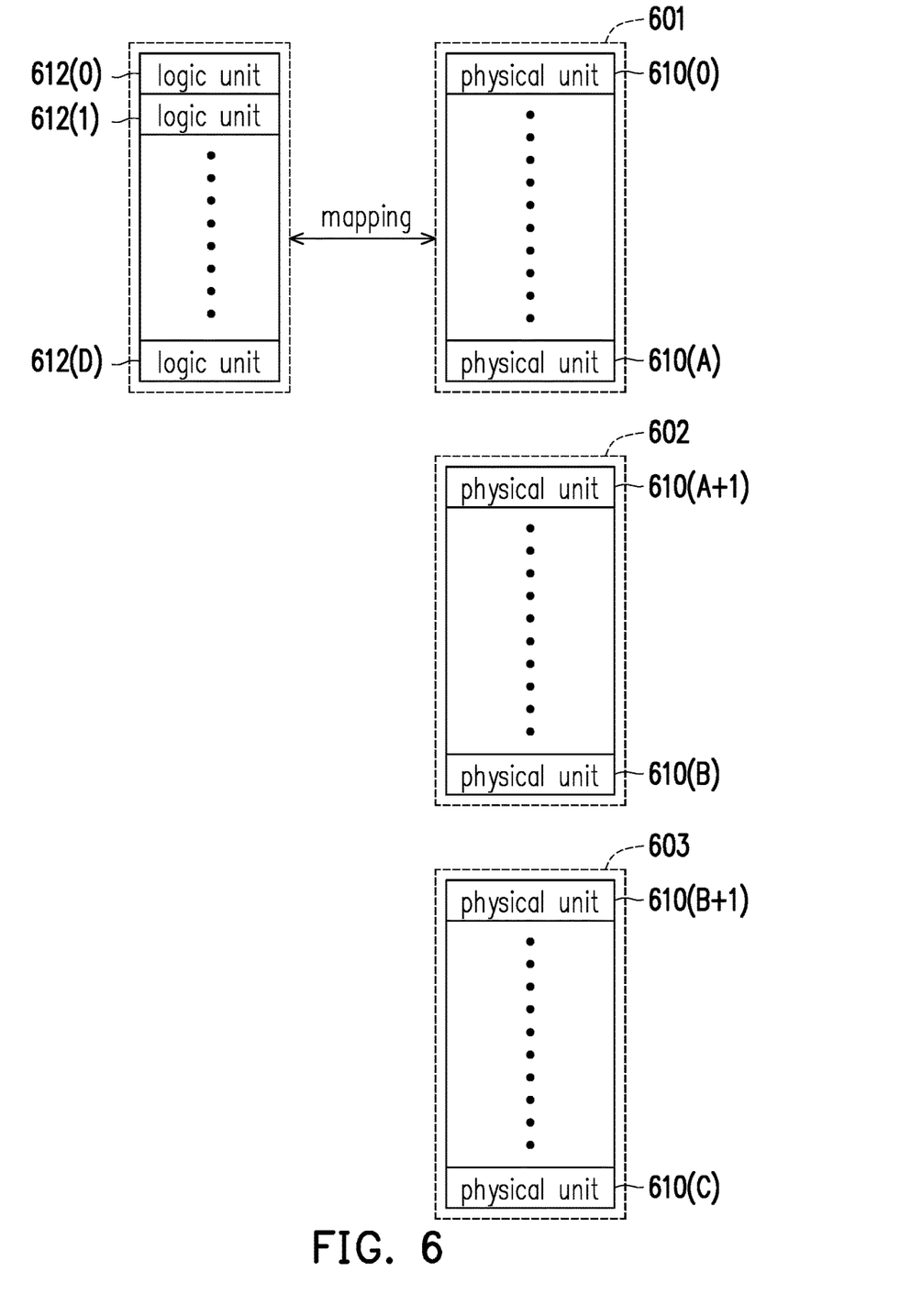
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. A memory management circuit 502 may logically group physical units 610(0) to 610(C) of a rewritable non-volatile memory module 406 into a storage area 601, a spare area 602, and a system area 603. The physical units 610(0) to 610(A) in the storage area 601 are stored with data. For example, the physical units 610(0) to 610(A) in the storage area 601 may be stored with valid data and invalid data. The physical units 610(A+1) to 610(B) in the spare area 602 have not been used to store data (for example, valid data). The physical units 610(B+1) to 610(C) in the system area 603 are configured to store system data, such as a logical-to-physical mapping table, a bad block management table, a device model, or other types of management data.

The memory management circuit 502 may select a physical unit from the physical units 610(A+1) to 610(B) in the spare area 602 and store data of at least one physical unit from the host system 11 or the storage area 601 into the selected physical unit. At the same time, the selected physical unit will be associated with the storage area 601. In addition, after erasing a certain physical unit in the storage area 601, the erased physical unit will be associated with the spare area 602 again.

In the exemplary embodiment, each physical unit belonging to the storage area 601 is also referred to as a non-spare physical unit, and each physical unit belonging to the spare area 602 is also referred to as a spare physical unit. In the exemplary embodiment, a physical unit refers to a physical erasing unit. However, in another exemplary embodiment, a physical unit may also contain multiple physical erasing units.

The memory management circuit 502 may configure logic units 612(0) to 612(D) to map the physical units 610(0) to 610(A) in the storage area 601. In the exemplary embodiment, each logic unit refers to a logic address. However, in another exemplary embodiment, a logic unit may also refer to a logic programming unit, a logic erasing unit, or consist of multiple continuous or discontinuous logic addresses. In addition, each of the logic units 612(0) to 612(D) may be mapped to one or more physical units. It should be noted that the memory management circuit 502 may not configure a logic unit mapped to the system area 603 to prevent the system data stored in the system area 603 from being modified by the user.

The memory management circuit 502 records mapping information (also referred to as logical-to-physical mapping information) between the logic unit and the physical unit in at least one logical-to-physical mapping table. The mapping information may reflect the mapping relationship between a certain physical unit and a certain logic unit in the storage area 601. The logical-to-physical mapping table is stored in the physical units 610(B+1) to 610(C) of the system area 603. The memory management circuit 502 may execute data access operations on the memory storage device 10 according to the logical-to-physical mapping table. For example, the memory management circuit 502 may obtain the mapping relationship between a certain physical unit and a certain logic unit in the storage area 601 according to a certain logical-to-physical mapping table. The memory management circuit 502 may access the physical unit according to the mapping relationship.

In the exemplary embodiment, the valid data is the latest data belonging to a certain logic unit, and the invalid data is the latest data not belonging to any logic unit. For example, if the host system 11 stores a new piece of data in a certain logic unit and overwrites the old data originally stored in the logic unit (that is, updates the data belonging to the logic unit), the new piece of data stored in the storage area 601 is the latest data belonging to the logic unit and will be marked as valid, and the overwritten old data may still be stored in the storage area 601 but is marked as invalid.

In the exemplary embodiment, if the data belonging to a certain logic unit is updated, the mapping relationship between the logic unit and the physical unit storing the old data belonging to the logic unit will be removed, and the mapping relationship between the logic unit and the physical unit storing the latest data belonging to the logic unit will be established. However, in another exemplary embodiment, if the data belonging to a certain logic unit is updated, the mapping relationship between the logic unit and the physical unit storing the old data belonging to the logic unit may still be maintained.

When the memory storage device 10 leaves the factory, the total number of physical units belonging to the spare area 602 will be a preset number (for example, 30). During the operation of the memory storage device 10, more and more physical units will be selected from the spare area 602 and is associated with the storage area 601 to store data (for example, user data from the host system 11). Therefore, the total number of physical units belonging to the spare area 602 may be gradually reduced with the use of the memory storage device 10.

During the operation of the memory storage device 10, the memory management circuit 502 may continuously update the total number of physical units belonging to the spare area 602. The memory management circuit 502 may execute a data merge operation according to the number of physical units in the spare area 602 (that is, the total number of spare physical units). For example, the memory management circuit 502 may determine whether the total number of physical units belonging to the spare area 602 is less than or equal to a threshold (also referred to as a first threshold). The first threshold is, for example, a value of 2 or more (for example, 10), which is not limited by the disclosure. If the total number of physical units belonging to the spare area 602 is less than or equal to the first threshold, the memory management circuit 502 may execute the data merge operation. In an exemplary embodiment, the data merge operation is also referred to as a garbage collection operation.

In the data merge operation, the memory management circuit 502 may select at least one physical unit from the storage area 601 as a source node. The memory management circuit 502 may copy the valid data from the selected physical unit (that is, the source node) to at least one physical unit as a recycling node. The physical unit (that is, the recycling node) for storing the copied valid data is selected from the spare area 602 and will be associated with the storage area 601. If the valid data stored in a certain physical unit has been copied to the recycling node, the physical unit may be erased and associated with the spare area 602. In an exemplary embodiment, the operation of associating a certain physical unit from the storage area 601 back to the spare area 602 again (or the operation of erasing a certain physical unit) is also referred to as releasing a spare physical unit. By executing the data merge operation, one or more spare physical units will be released and the total number of physical units belonging to the spare area 602 will gradually increase.

After starting the data merge operation, if the physical unit belonging to the spare area 602 meets a specific condition, the data merge operation may be stopped. For example, the memory management circuit 502 may determine whether the total number of physical units belonging to the spare area 602 is greater than or equal to a threshold (hereinafter also referred to as a second threshold). For example, the second threshold may be greater than the first threshold. If the total number of physical units belonging to the spare area 602 is greater than or equal to the second threshold, the memory management circuit 502 may stop the data merge operation. It should be noted that stopping the data merge operation refers to ending the data merge operation being currently executed. After stopping a data merge operation, if the total number of physical units belonging to the spare area 602 is less than or equal to the first threshold again, the next data merge operation may be executed again to release new spare physical units.

In particular, in the exemplary embodiment of the disclosure, in a data merge operation, not only the physical unit (also known as a first physical unit) as the source node of the data merge operation (also known as a first data merge operation) is selected, the physical unit (also known as at least one second physical unit) as the source node of the next data merge operation (also known as a second data merge operation) is also selected in advance, so that when the mapping information of the logic unit mapped by at least one first physical unit in the first data merge operation contains the mapping information of the logic unit of at least one second physical unit in the second data merge operation, the valid data in at least one second physical unit is synchronously identified in the first data merge operation. When entering the second data merge operation (for example, after ending the first data merge operation), if the total number of physical units belonging to the spare area 602 is less than or equal to the first threshold again, the step of reading the mapping information of at least one second physical unit from the rewritable non-volatile memory module may be omitted, and the identified valid data in at least one second physical unit is directly copied to a target node, thereby achieving reduction in the number of accesses to the memory storage device in the data merge process. Hereinafter, the data merge method of the disclosure will be described in more detail with reference to FIG. 7A and FIG. 7B.

Figure 7A:
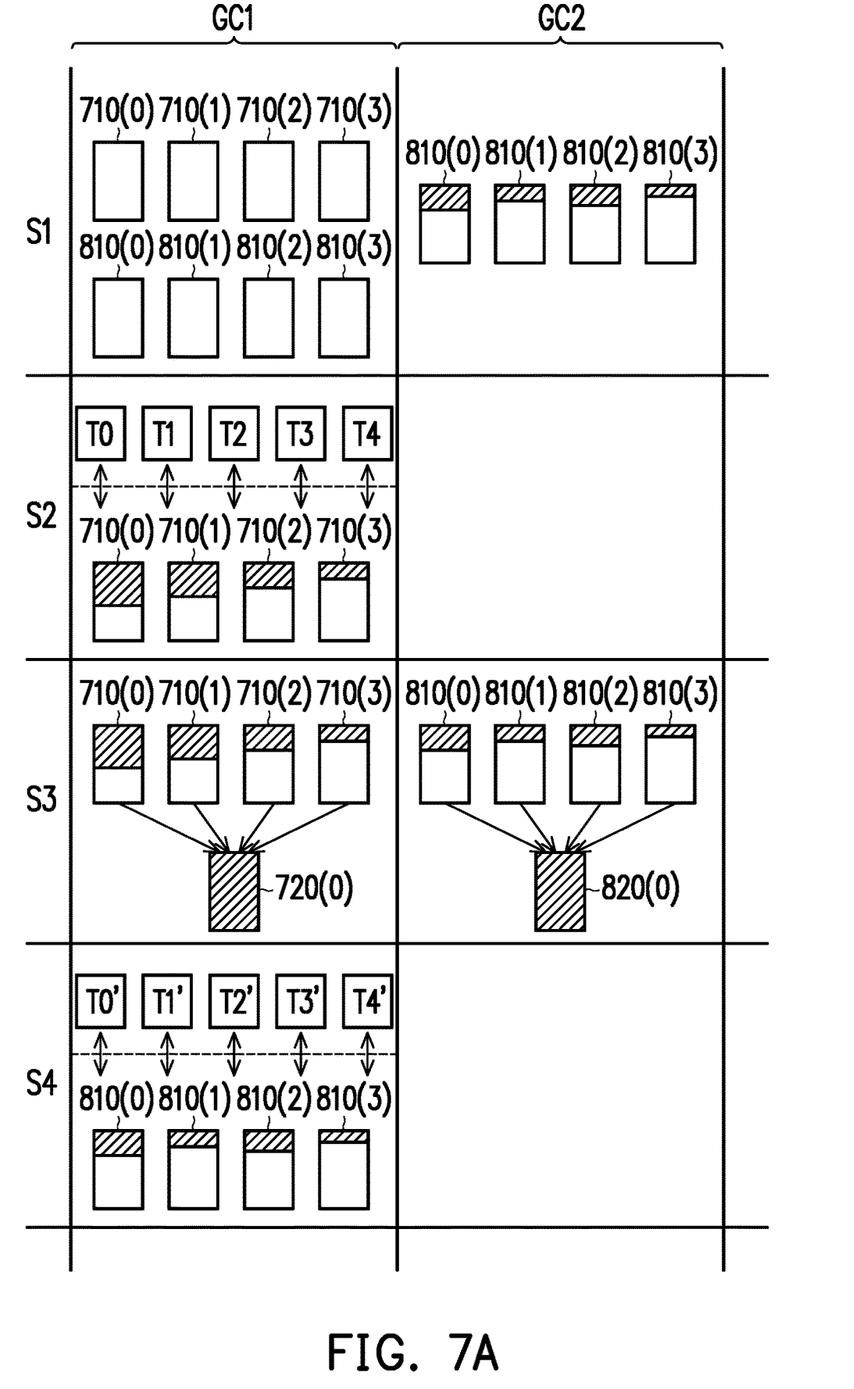
FIG. 7A and FIG. 7B are schematic diagrams of a data merge operation according to an exemplary embodiment of the disclosure.
Figure 7B:
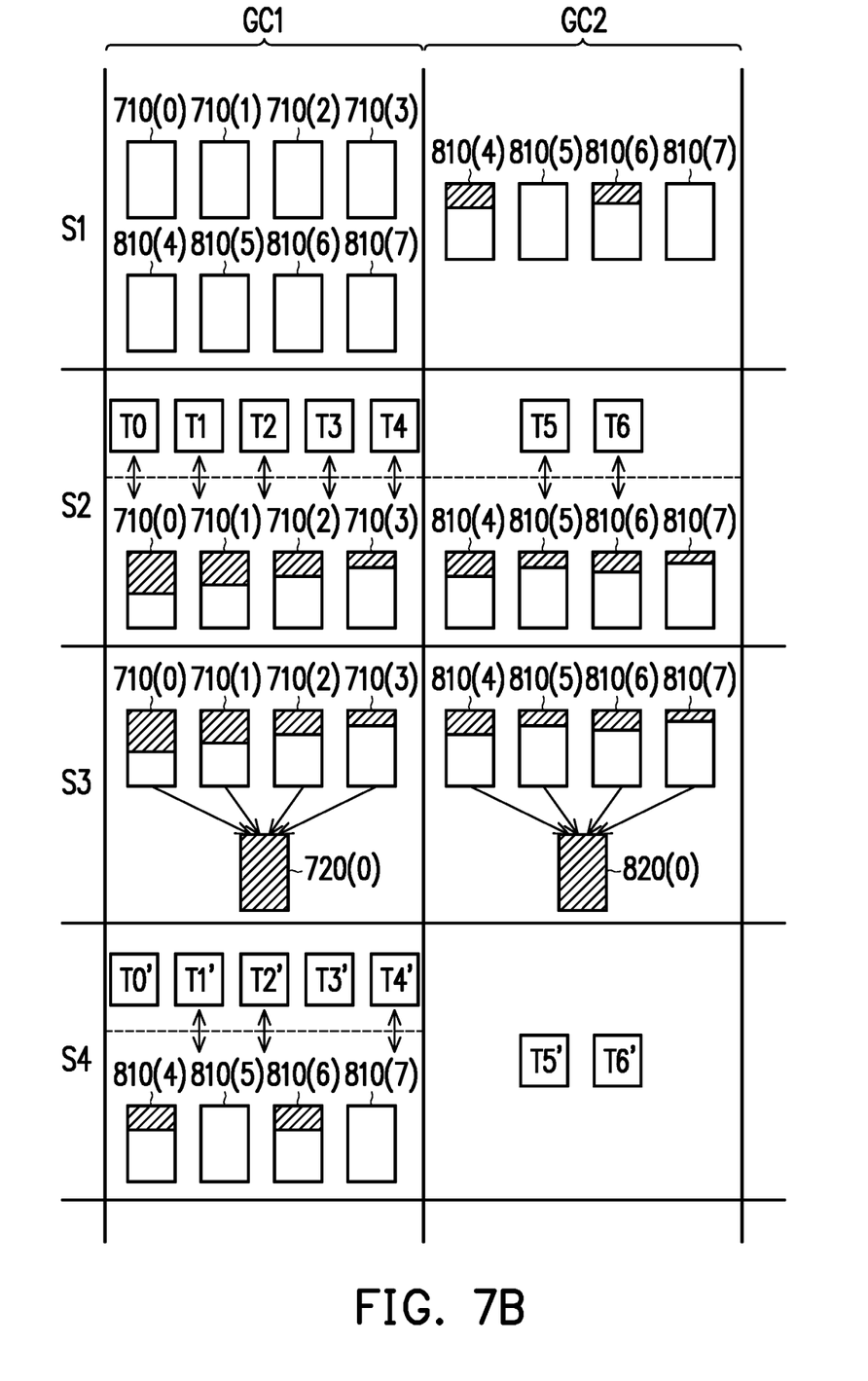

FIG. 7A and FIG. 7B are schematic diagrams of a data merge operation according to an exemplary embodiment of the disclosure.

Please refer to FIG. 7A first. A data merge operation includes, for example, a first stage S1 to a fourth stage S4. The first stage S1 is the step of selecting a source node and a target node, the second stage S2 is the step of identifying valid data, the third stage S3 is the step of copying data, and the fourth stage S4 is the step of updating mapping information. In the data merge operation of the exemplary embodiment of the disclosure, in the first stage S1 after starting a data merge operation GC1 (also referred to as a first data merge operation GC1), a memory management circuit 502 will select at least one physical unit (also referred to as at least one first physical unit) for executing the first data merge operation and at least one physical unit (also referred to as at least one second physical unit) for executing a next data merge operation GC2 (also referred to as a second data merge operation GC2) from the rewritable non-volatile memory module 406. For example, in the exemplary embodiment, the memory management circuit 502 selects at least one first physical units 710(0) to 710(3) as the source nodes of the first data merge operation GC1, and selects at least one second physical units 810(0) to 810(3) as the source nodes of the second data merge operation GC2. It should be understood that the disclosure does not limit the number of physical units selected by the memory management circuit 502 as the source nodes. For example, in another exemplary embodiment, the selected at least one first physical unit and at least one second physical unit may respectively be greater than or less than 4.

Then, in the second stage S2 of the first data merge operation GC1, the memory management circuit 502 reads the mapping information (also referred to as first mapping information) from the rewritable non-volatile memory module 406. Here, the first mapping information is, for example, logical-to-physical mapping tables T0 to T4 containing logical-to-physical mapping information of at least one first physical units 710(0) to 710(3). In addition, the memory management circuit 502 will identify valid data (also referred to as first valid data) in at least one first physical units 710(0) to 710(3) according to the logical-to-physical mapping tables T0 to T4.

In the third stage S3 of the first data merge operation GC1, the memory management circuit 502 will copy the first valid data collected from at least one first physical units 710(0) to 710(3) to at least one physical unit 720(0) (also referred to as at least one third physical unit 720(0)) as the target node according to the logical-to-physical mapping tables T0 to T4. It must be understood that the disclosure does not limit the number of physical units selected by the memory management circuit 502 as the target node in the first stage S1. For example, the selected at least one third physical unit may be greater than 1.

After the first valid data in at least one first physical units 710(0) to 710(3) is copied to at least one physical unit 720(0), since the data of the logic units corresponding to at least one first physical units 710(0) to 710(3) has been changed, in the fourth stage S4 of the first data merge operation GC1, the memory management circuit 502 will update the first mapping information (that is, the logical-to-physical mapping tables T0 to T4). For example, the logical-to-physical mapping tables T0 to T4 are updated to logical-to-physical mapping tables T0' to T4'.

It should be noted that in the first data merge operation GC1, the memory management circuit 502 will also identify valid data (also referred to as second valid data) in at least one second physical units 810(0) to 810(3) of the source nodes of the next data merge operation (that is, the second data merge operation GC2) according to the first mapping information. For example, in the exemplary embodiment, in the fourth stage S4 of the first data merge operation GC1, the memory management circuit 502 identifies the second valid data in at least one second physical units 810(0) to 810(3) according to the updated first mapping information (that is, the logical-to-physical mapping tables T0' to T4'). However, the disclosure is not limited thereto, and the memory management circuit 502 may also identify the second valid data in at least one second physical units 810(0) to 810(3) as the source nodes of the second data merge operation GC2 in other stages of the first data merge operation GC1. For example, in another exemplary embodiment, the memory management circuit 502 may identify the first valid data in at least one first physical units 710(0) to 710(3) according to the logical-to-physical mapping tables T0 to T4 while identifying the second valid data in at least one second physical units 810(0) to 810(3) according to the logical-to-physical mapping tables T0 to T4 in the second stage S2 of the first data merge operation GC1.

In particular, in the exemplary embodiment, the first mapping information containing the logical-to-physical mapping information of at least one first physical units 710(0) to 710(3) read by the memory management circuit 502 in the second stage S2 of the first data merge operation GC1 also contains all logical-to-physical mapping information required to identify the second valid data in at least one second physical units 810(0) to 810(3). Therefore, the memory management circuit 502 may identify all valid data (that is, the second valid data) in at least one second physical units 810(0) to 810(3) according to the logical-to-physical mapping tables T0 to T4 or the updated logical-to-physical mapping tables T0' to T4'. Specifically, the memory management circuit 502 records the storage address of the identified second valid data in a valid data address table. In other words, the valid data address table is used to reflect the storage address of the second valid data in at least one second physical units 810(0) to 810(3).

Please continue to refer to FIG. 7A. After ending the first data merge operation GC1, the memory management circuit 502 enters the next data merge operation (that is, the second data merge operation GC2), and may directly copy the second valid data collected from at least one second physical units 810(0) to 810(3) to at least one physical unit (also referred to as at least one fourth physical unit) as the source node according to the second valid data identified in the first data merge operation GC1. More specifically, at least one second physical units 810(0) to 810(3) in the first stage S1 of the second data merge operation GC2 are the source nodes selected in advance in the first data merge operation GC1. Also, in the exemplary embodiment, since the valid data address table recorded in the first data merge operation GC1 records all valid data (that is, the second valid data) in at least one second physical units 810(0) to 810(3), in the third stage S3 of the second data merge operation GC2, the memory management circuit 502 may directly copy the second valid data in at least one second physical units 810(0) to 810(3) to at least one fourth physical unit 820(0) only according to the valid data address table. It can be seen that in the second data merge operation GC2, the second stage S2 for identifying the valid data of the source node may be omitted, that is, the memory management circuit 502 does not need to execute the operation of identifying the second valid data in at least one second physical units 810(0) to 810(3). In other words, through the data merge method of the disclosure, in a data merge operation, there is no need to execute the operation of reading the logical-to-physical mapping table of the physical unit as the source node of the current data merge operation to identify the valid data, so that the number of accesses to the memory storage device during the data merge operation may be truly reduced.

More specifically, in the case of the exemplary embodiment of FIG. 7A, the logical-to-physical mapping range of the first mapping information (that is, the logical-to-physical mapping tables T0 to T4) of at least one first physical units 710(0) to 710(3) read by the memory management circuit 502 in the first data merge operation GC1 contains the range of the logical-to-physical mapping information corresponding to all valid data (that is, the second valid data) in at least one second physical units 810(0) to 810(3) of the second data merge operation GC2. Therefore, in the second data merge operation GC2, the operation of reading 5 logical-to-physical mapping tables as originally required may be completely omitted. In another exemplary embodiment, if the number of logical-to-physical mapping tables of at least one first physical unit read by the memory management circuit 502 in the first data merge operation GC1 is 100, and 80 logical-to-physical mapping tables in the 100 logical-to-physical mapping tables may be used to identify all valid data in at least one second physical unit of the second data merge operation GC2, the data merge method of the disclosure may achieve the omission of the operation of reading 80 logical-to-physical mapping tables from the rewritable non-volatile memory module 406 in a data merge operation (for example, the second data merge operation GC2), thereby reducing the number of accesses to the memory storage device in the data merge operation.

In another exemplary embodiment of the disclosure, the case where the mapping information of the physical unit of the source node read in a data merge operation only contains the mapping information of a part of the physical unit of the source node in the next data merge operation is explained.

Please refer to FIG. 7B. The memory management circuit 502 selects at least one first physical units 710(0) to 710(3) for executing the first data merge operation and at least one second physical units 810(4) to 810(7) for executing the next data merge operation GC2 (that is, the second data merge operation GC2) from the rewritable non-volatile memory modules 406 in the first stage S1 after starting the first data merge operation GC1. Similarly, in the exemplary embodiment, the disclosure does not limit the number of physical units selected by the memory management circuit 502 as the source node.

Then, in the second stage S2 of the first data merge operation GC1, the memory management circuit 502 will read the first mapping information containing the logical-to-physical mapping information of at least one first physical units 710(0) to 710(3) from the rewritable non-volatile memory module 406. For example, the first mapping information includes the logical-to-physical mapping tables T0 to T4. Moreover, the memory management circuit 502 will identify the first valid data in at least one first physical units 710(0) to 710(3) according to the logical-to-physical mapping tables T0 to T4.

In the third stage S3 of the first data merge operation GC1, the memory management circuit 502 will copy the first valid data collected from at least one first physical units 710(0) to 710(3) to at least one third physical unit 720(0) as the target node according to the logical-to-physical mapping tables T0 to T4. Here, the disclosure also does not limit the number of physical units selected by the memory management circuit 502 as the target node. After the first valid data in at least one first physical units 710(0) to 710(3) is copied to at least one physical unit 720(0), since the data of the logic units corresponding to at least one first physical units 710(0) to 710(3) has been changed, in the fourth stage S4 of the first data merge operation GC1, the memory management circuit 502 will update the logical-to-physical mapping tables T0 to T4 to the logical-to-physical mapping tables T0' to T4'.

In the exemplary embodiment, the first mapping information containing the logical-to-physical mapping information of at least one first physical units 710(0) to 710(3) read by the memory management circuit 502 in the second stage S2 of the first data merge operation GC1 only contains the logical-to-physical mapping information required to identify a part (also referred to as a first part) of the second valid data in at least one second physical units 810(4) to 810(7). For example, in the fourth stage S4 of the first data merge operation GC1, the memory management circuit 502 may identify the first part of the second valid data in at least one second physical units 810(4) to 810(7) according to the updated logical-to-physical mapping tables T1', T2', and T4', and the memory management circuit 502 will record the storage address of the identified first part of the second valid data in the valid data address table. Here, the valid data address table is used to reflect the storage address of the first part of the second valid data in at least one second physical units 810(4) to 810(7).

Please continue to refer to FIG. 7B. After ending the first data merge operation GC1, when entering the next data merge operation (that is, the second data merge operation GC2), since the valid data address table recorded in the first data merge operation GC1 only records the first part of the second valid data in at least one second physical units 810(4) to 810(7), in the third stage S2 of the second data merge operation GC2, the memory management circuit 502 will read the mapping information (also referred to as second mapping information) corresponding to at least one second physical units 810(4) to 810(7) from the rewritable non-volatile memory module 406. Here, the second mapping information only contains the logical-to-physical mapping information, such as logical-to-physical mapping tables T5 and T6, required to identify another part (also referred to as a second part) of the second valid data in at least one second physical units 810(4) to 810(7). In other words, since the first mapping information only contains the logical-to-physical mapping information required to identify the first part of the second valid data in at least one second physical units 810(4) to 810(7), the logical-to-physical mapping range of the first mapping information does not contain the logical-to-physical mapping range of the second mapping information. In addition, in the exemplary embodiment, the sum of the first part of the second valid data and the second part of the second valid data is all valid data in at least one second physical units 810(4) to 810(7).

After that, in the third stage S3 of the second data merge operation GC2, the memory management circuit 502 may copy all valid data (that is, the first part of the second valid data and the second part of the second valid data) in at least one second physical units 810(4) to 810(7) to at least one fourth physical unit 820(0) from the logical-to-physical mapping tables T5 and T6 according to the valid data address table. Similarly, in the fourth stage S4 of the second data merge operation GC2, the memory management circuit 502 will update the second mapping information (that is, the logical-to-physical mapping tables T5 and T6). For example, the logical-to-physical mapping tables T5 and T6 are updated to logical-to-physical mapping tables T5' and T6'.

Based on the above, it can be seen that the logical-to-physical mapping tables for identifying the second valid data in at least one second physical units 810(4) to 810(7) includes 5 logical-to-physical mapping tables T1, T2, T4, T5, and T6 (or the logical-to-physical mapping tables T1', T2', T4', T5', and T6'). The logical-to-physical mapping information belonging to the first part of the second valid data in the logical-to-physical mapping tables T1, T2, and T4 (or the logical-to-physical mapping tables T1', T2', and T4') has been recorded in the valid data address table in the first data merge operation GC1. Therefore, in the second stage S2 of the second data merge operation GC2, the operation of reading 5 logical-to-physical mapping tables as originally required may be omitted, and only 2 logical-to-physical mapping tables are read, which may correspondingly reduce the number of accesses to the memory storage device in the data merge operation.

In another exemplary embodiment, if the number of logical-to-physical mapping tables of at least one first physical unit read by the memory management circuit 502 in the first data merge operation GC1 is 100, and 60 logical-to-physical mapping tables in the 100 logical-to-physical mapping tables may be used to identify a part of valid data in at least one second physical unit of the second data merge operation GC2, and another part of the valid data in at least one second physical unit still needs another 40 logical-to-physical mapping tables to identify, the data merge method of the disclosure may achieve the omission of the operation of reading 60 logical-to-physical mapping tables from the rewritable non-volatile memory module 406 in a data merge operation (for example, the second data merge operation GC2). That is, the number of logical-to-physical mapping tables required to be read (40) may be less than half of the number of logical-to-physical mapping tables originally required to be read (100) in the data merge operation, thereby reducing the number of accesses to the memory storage device in the data merge operation.

Through the mechanism of selecting in advance the source node in the next data merge operation and identifying in advance the valid data of the source node in a data merge operation according to the data merge operation of the disclosure, the number of logical-to-physical mapping tables required to be loaded in the data merge operation may be effectively reduced, thereby reducing the number of data merge operations executed by the memory management circuit. As such, the number of accesses to the rewritable non-volatile memory module 406 of FIG. 4 may be effectively reduced, thereby improving the overall operating performance of the memory storage device.

Figure 8:
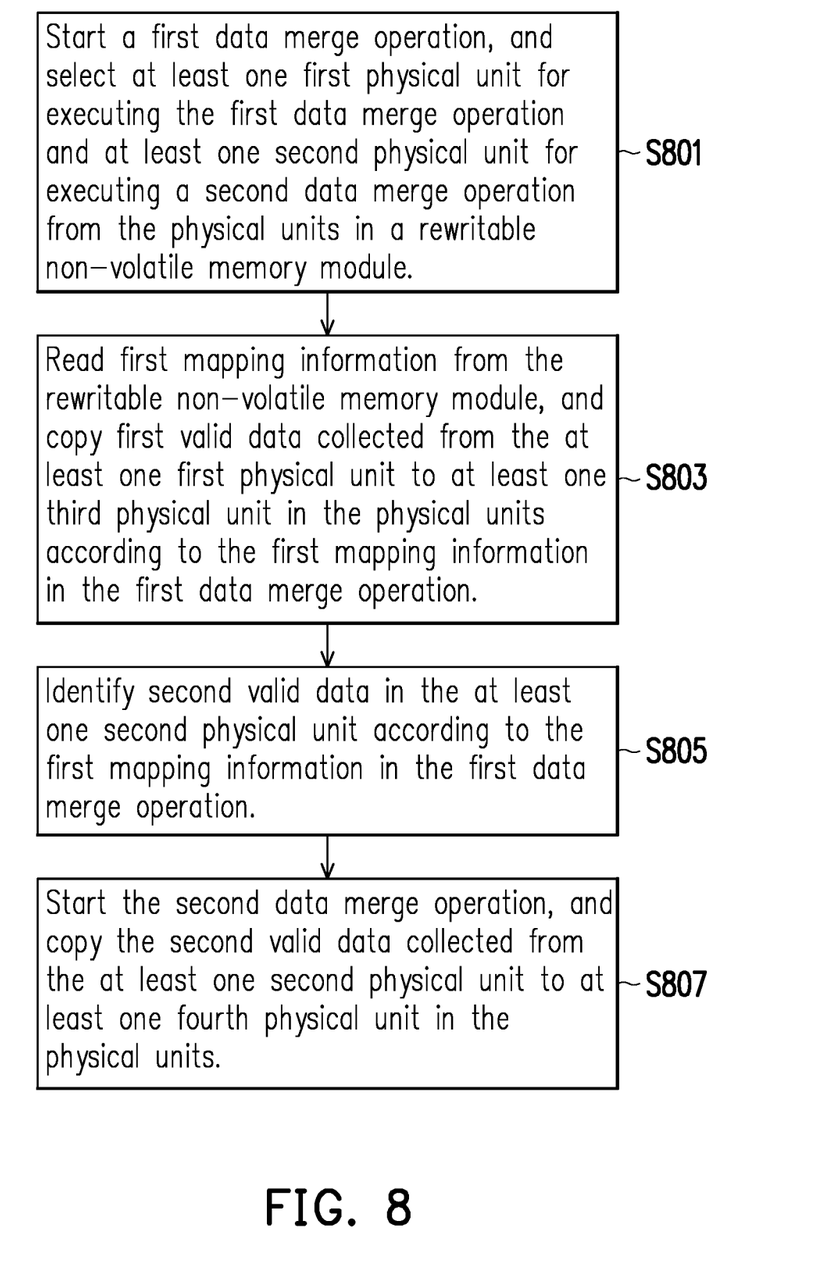
FIG. 8 is a flowchart of a data merge method according to an exemplary embodiment of the disclosure.

FIG. 8 is a flowchart of a data merge method according to an exemplary embodiment of the disclosure. Please refer to FIG. 8. In Step S801, a memory management circuit 502 starts a first data merge operation, and selects at least one first physical unit for executing the first data merge operation and at least one second physical unit for executing a second data merge operation from the physical units in a rewritable non-volatile memory module. In Step S803, the memory management circuit 502 reads first mapping information from the rewritable non-volatile memory module, and copies first valid data collected from the at least one first physical unit to at least one third physical unit in the physical units according to the first mapping information in the first data merge operation. In Step S805, the memory management circuit 502 identifies second valid data in the at least one second physical unit according to the first mapping information in the first data merge operation. In Step S807, the memory management circuit 502 starts the second data merge operation, and copies the second valid data collected from the at least one second physical unit to at least one fourth physical unit in the physical units.

However, each step in FIG. 8 has been described in detail as above, and will not be repeated here. It should be noted that each step in FIG. 8 may be implemented as multiple program codes or circuits, which is not limited by the disclosure. In addition, the method in FIG. 8 may be used in conjunction with the above exemplary embodiments or may be used alone, which is not limited by the disclosure.

In summary, in the data merge method, the memory storage device, and the memory control circuit unit provided by the exemplary embodiments of the disclosure, through selecting in advance the source node of the next data merge operation in the current data merge operation and identifying in advance the valid data of the source node, the read operation of the logical-to-physical mapping table used to access the source node in the next data merge operation may be omitted. In the way, the number of accesses to the memory storage device in the data merge operation may be effectively reduced, thereby extending the service life of the memory storage device. In particular, in the case where the number of logical-to-physical mapping tables corresponding to the source node is huge and the repetition rate of the logical-to-physical mapping tables used in the previous data merge operation is high, through the data merge method of the disclosure, the number of logical-to-physical mapping tables required to be loaded in the data merge operation and the number of data merge operations executed by the memory management circuit may be reduced, thereby improving the overall operating performance of the memory storage device.

What is claimed is:

1. A data merge method for a rewritable non-volatile memory module, wherein the rewritable non-volatile memory module comprises a plurality of physical units, the data merge method comprising:

starting a first data merge operation, and selecting at least one first physical unit for executing the first data merge operation and at least one second physical unit for executing a second data merge operation from the plurality of physical units;

reading first mapping information from the rewritable non-volatile memory module, and copying first valid data collected from the at least one first physical unit to at least one third physical unit in the plurality of physical units according to the first mapping information during the first data merge operation;

identifying second valid data in the at least one second physical unit according to the first mapping information during the first data merge operation; and ending the first merge operation and after the first merge operation is ended, starting the second data merge operation, and copying the second valid data collected from the at least one second physical unit to at least one fourth physical unit in the plurality of physical units based on the identifying performed during the first data merge operation.

2. The data merge method according to claim 1, wherein the step of copying the first valid data collected from the at least one first physical unit to the at least one third physical unit in the plurality of physical units according to the first mapping information comprises:

updating the first mapping information, wherein the step of identifying the second valid data in the at least one second physical unit according to the first mapping information in the first data merge operation comprises:

identifying the second valid data in the at least one second physical unit according to the updated first mapping information.

3. The data merge method according to claim 1, wherein the step of identifying the second valid data in the at least one second physical unit according to the first mapping information during the first data merge operation comprises:

recording a valid data address table according to the identified second valid data, wherein the valid data address table is used to reflect a storage address of the second valid data in the at least one second physical unit.

4. The data merge method according to claim 3, wherein the step of copying the second valid data collected from the at least one second physical unit to the at least one fourth physical unit in the plurality of physical units comprises:

copying the second valid data in the at least one second physical unit to the at least one fourth physical unit according to the valid data address table.

5. The data merge method according to claim 1, wherein in the second data merge operation, an operation of identifying at least part of the second valid data in the at least one second physical unit is not executed.

6. The data merge method according to claim 1, wherein in the first data merge operation, the second valid data in the at least one second physical unit identified according to the first mapping information comprises only a first part of the second valid data, wherein in the second data merge operation, second mapping information is read from the rewritable non-volatile memory module, and a second part of the second valid data in the at least one second physical unit is identified according to the second mapping information, wherein a logical-to-physical mapping range of the first mapping information does not comprise a logical-to-physical mapping range of the second mapping information.

7. A memory storage device, comprising:

a connection interface unit, configured to couple to a host system;

a rewritable non-volatile memory module, comprising a plurality of physical units; and a memory control circuit unit, coupled to the connection interface unit and the rewritable non-volatile memory module, wherein the memory control circuit unit is configured to start a first data merge operation, and select at least one first physical unit for executing the first data merge operation and at least one second physical unit for executing a second data merge operation from the plurality of physical units, the memory control circuit unit further reads first mapping information from the rewritable non-volatile memory module, and copies first valid data collected from the at least one first physical unit to at least one third physical units in the plurality of physical units according to the first mapping information during the first data merge operation, the memory control circuit unit is further configured to identify second valid data in the at least one second physical unit according to the first mapping information during the first data merge operation, and the memory control circuit unit is further configured to end the first merge operation and after the first merge operation is ended, start the second data merge operation, and copy the second valid data collected from the at least one second physical unit to at least one fourth physical unit in the plurality of physical units based on the identifying performed during the first data merge operation.

8. The memory storage device according to claim 7, wherein an operation after copying the first valid data collected from the at least one first physical unit to the at least one third physical unit in the plurality of physical units according to the first mapping information comprises:

updating the first mapping information, wherein the operation of identifying the second valid data in the at least one second physical unit according to the first mapping information in the first data merge operation comprises:

identifying the second valid data in the at least one second physical unit according to the updated first mapping information.

9. The memory storage device according to claim 7, wherein the operation of identifying the second valid data in the at least one second physical unit according to the first mapping information during the first data merge operation comprises:

recording a valid data address table according to the identified second valid data, wherein the valid data address table is used to reflect a storage address of the second valid data in the at least one second physical unit.

10. The memory storage device according to claim 9, wherein the operation of copying the second valid data collected from the at least one second physical unit to the at least one fourth physical unit in the plurality of physical units comprises:

copying the second valid data in the at least one second physical unit to the at least one fourth physical unit according to the valid data address table.

11. The memory storage device according to claim 7, wherein in the second data merge operation, the memory control circuit unit does not execute an operation of identifying at least part of the second valid data in the at least one second physical unit.

12. The memory storage device according to claim 7, wherein in the first data merge operation, the second valid data in the at least one second physical unit identified according to the first mapping information comprises only a first part of the second valid data, wherein
in the second data merge operation, the memory control circuit unit reads second mapping information from the rewritable non-volatile memory module, and identifies a second part of the second valid data in the at least one second physical unit according to the second mapping information, wherein
a logical-to-physical mapping range of the first mapping information does not comprise a logical-to-physical mapping range of the second mapping information.

13. A memory control circuit unit for controlling a rewritable non-volatile memory module, wherein the rewritable non-volatile memory module comprises a plurality of physical units, the memory control circuit unit comprising:
a host interface, configured to couple to a host system;
a memory interface, configured to couple to the rewritable non-volatile memory module; and
a memory management circuit, coupled to the host interface and the memory interface, wherein
the memory management circuit is configured to start a first data merge operation, and select at least one first physical unit for executing the first data merge operation and at least one second physical unit for executing a second data merge operation from the plurality of physical units,
the memory management circuit is further configured to read first mapping information from the rewritable non-volatile memory module, and copy first valid data collected from the at least one first physical unit to at least one third physical unit in the plurality of physical units according to the first mapping information during the first data merge operation,
the memory management circuit is further configured to identify second valid data in the at least one second physical unit according to the first mapping information during the first data merge operation, and
the memory management circuit is further configured to end the first merge operation and after the first merge operation is ended, start the second data merge operation, and copy the second valid data collected from the at least one second physical unit to at least one fourth physical unit in the plurality of physical units based on the identifying performed during the first data merge operation.

14. The memory control circuit unit according to claim 13, wherein an operation after copying the first valid data collected from the at least one first physical unit to the at least one third physical unit in the plurality of physical units according to the first mapping information comprises:
updating the first mapping information, wherein
the operation of identifying the second valid data in the at least one second physical unit according to the first mapping information in the first data merge operation comprises:
identifying the second valid data in the at least one second physical unit according to the updated first mapping information.

15. The memory control circuit unit according to claim 13, wherein the operation of identifying the second valid data in the at least one second physical unit according to the first mapping information during the first data merge operation comprises:
recording a valid data address table according to the identified second valid data, wherein the valid data address table is used to reflect a storage address of the second valid data in the at least one second physical unit.

16. The memory control circuit unit according to claim 15, wherein the operation of copying the second valid data collected from the at least one second physical unit to the at least one fourth physical unit in the plurality of physical units comprises:
copying the second valid data in the at least one second physical unit to the at least one fourth physical unit according to the valid data address table.

17. The memory control circuit unit according to claim 13, wherein in the second data merge operation,
the memory management circuit does not execute an operation of identifying at least part of the second valid data in the at least one second physical unit.

18. The memory control circuit unit according to claim 13, wherein in the first data merge operation, the second valid data in the at least one second physical unit identified according to the first mapping information only comprises a first part of the second valid data, wherein
in the second data merge operation, the memory management circuit reads second mapping information from the rewritable non-volatile memory module, and identifies a second part of the second valid data in the at least one second physical unit according to the second mapping information, wherein
a logical-to-physical mapping range of the first mapping information does not comprise a logical-to-physical mapping range of the second mapping information.

* * * * *